United States Patent [19]

Meynier

[11] Patent Number: 5,027,598
[45] Date of Patent: Jul. 2, 1991

[54] ASSEMBLY COMPOSED OF A PNEUMATIC BOOSTER, A MASTER CYLINDER AND A RESERVOIR HAVING VACUUM SUPPLY PASSAGE INCORPORATED WITHIN

[75] Inventor: Guy Meynier, Aulnay-Sous-Bois, France

[73] Assignee: Bendix Europe Services Techniques, Drancy, France

[21] Appl. No.: 540,654

[22] Filed: Jun. 19, 1990

[30] Foreign Application Priority Data

Jul. 19, 1989 [FR] France ................... 89 09653

[51] Int. Cl.$^5$ .................. B60T 13/00; B60T 11/32; B60T 17/18
[52] U.S. Cl. ................... 60/547.1; 60/582; 60/585; 91/468
[58] Field of Search ............ 91/366.1, 376 R, 368, 91/442, 452, 468; 60/547.1, 582, 585

[56] References Cited

U.S. PATENT DOCUMENTS

| | | | |
|---|---|---|---|
| 2,880,706 | 4/1959 | Price | 91/376 |
| 3,013,537 | 12/1961 | Schultz | 60/547.1 |
| 4,012,080 | 3/1977 | Engle | 60/547.1 X |
| 4,469,008 | 9/1984 | Seki | 91/376 R |
| 4,475,444 | 10/1984 | Hendrickson | 91/376 R X |
| 4,827,720 | 5/1989 | Flynn et al. | 60/547.1 |

FOREIGN PATENT DOCUMENTS 3612357 10/1987 Fed. Rep. of Germany .

OTHER PUBLICATIONS

Motor: The Automotive Business Magazine, Apr. 1946, p. 56.

Primary Examiner—Edward K. Look
Assistant Examiner—John Ryznic
Attorney, Agent, or Firm—Larry J. Palguta; Ken C. Decker

[57] ABSTRACT

The assembly is composed of a vacuum pneumatic booster (1), a master cylinder (3) and a reservoir (5) of fluid under low pressure which feeds the master cylinder, and is intended to convert a force exerted on a control pedal into a fluid pressure supplying at least one fluid motor. The booster (1) has at least one chamber connected to a vacuum source via a non-return valve (30). This chamber is connected to the source via a duct (21) formed in the master cylinder (3), the non-return valve (30) being arranged at the outlet of the duct (21). The non-return valve (30) is arranged at the end of a pipe (25), the other end of which is connected in a sealed manner to the duct (21), the non-return valve (30) and the pipe (25) being incorporated into the reservoir (5).

2 Claims, 1 Drawing Sheet

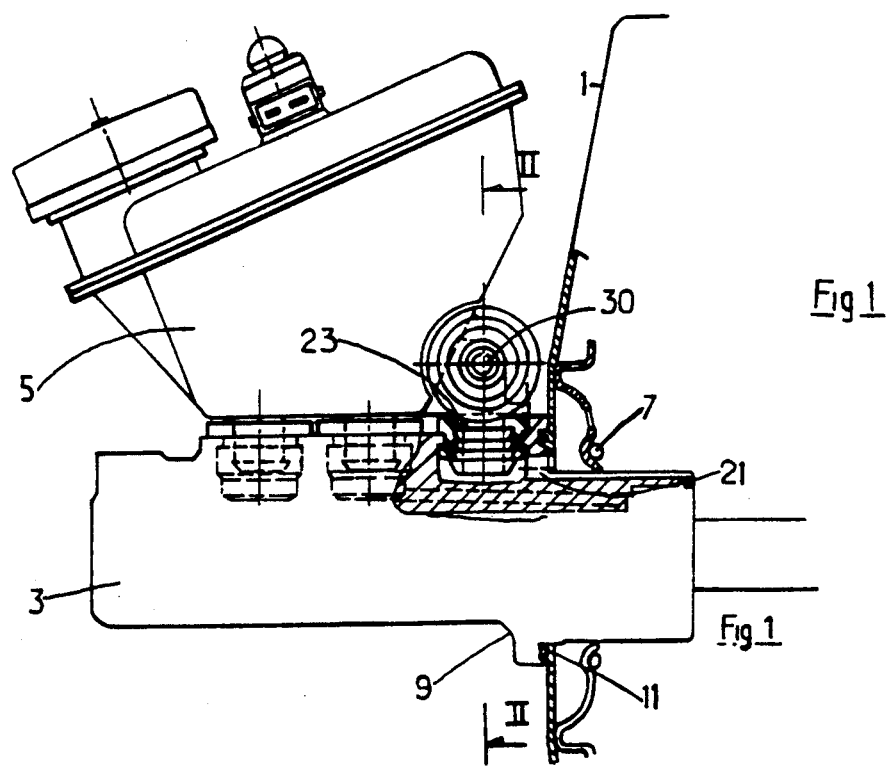
Fig 1
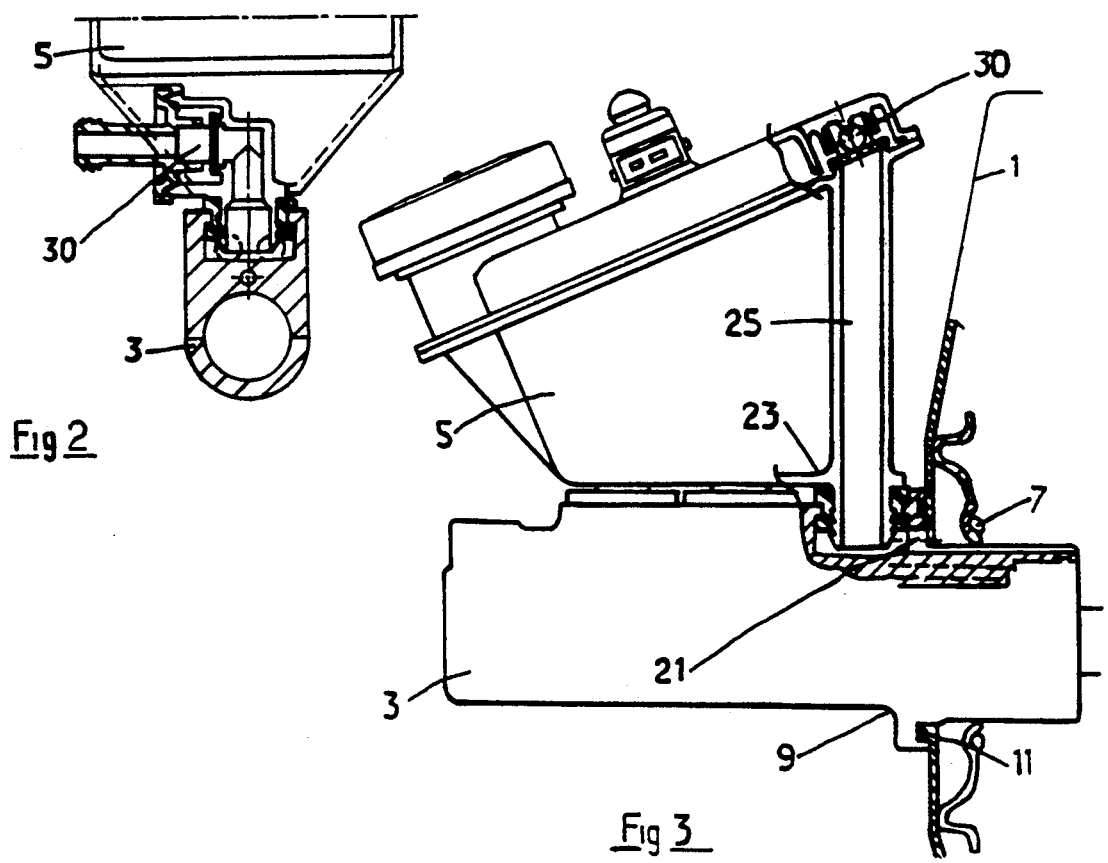
Fig 2
Fig 3

ASSEMBLY COMPOSED OF A PNEUMATIC BOOSTER, A MASTER CYLINDER AND A RESERVOIR HAVING VACUUM SUPPLY PASSAGE INCORPORATED WITHIN

BACKGROUND OF THE INVENTION

The present invention relates to an assembly composed of a vacuum pneumatic booster, a master cylinder and a reservoir of fluid under low pressure which feeds the master cylinder.

Such an assembly is generally employed in the brake circuit of motor vehicles, but is, generally speaking, used to convert a force exerted on a control pedal into a fluid pressure supplying at least one fluid motor.

In a known manner, the booster of such an assembly has at least one chamber connected to a vacuum source via a non-return valve in order to maintain a vacuum in this chamber for a while after the source has dried up. The vacuum source is generally obtained by venturi effect in the region of the carburetor of the vehicle's heat engine, or alternatively it is provided by a conventional vacuum pump.

In the prior art e.g. in U.S. Pat. No. 3,013,537, the non-return valve is arranged in the booster housing in a peripheral area where the tractive forces exerted in the sheet metal of the housing are not too great. This area is, however, an area of weakness of the housing and requires a specific treatment. In addition, being arranged at the periphery of the booster housing, this valve constitutes a projecting element which may cause an obstruction owing to the general congestion in the engine compartment.

In order to free this engine compartment, it has been provided furthermore to arrange the booster in the passenger compartment of the vehicle, the booster/master cylinder assembly being fastened to the bulkhead in the region of the screws for fastening the master cylinder to the booster. In this case, the non-return valve constitutes an obvious disturbance to the passengers owing to the noises produced in obtaining and maintaining the vacuum. Moreover, it is then necessary for a tube to pass through the bulkhead.

The object of the present invention is to overcome these disadvantages by means of a compact and inexpensive assembly.

In DE-A-3 612 357, the chamber under vacuum of the pneumatic booster is connected to the vacuum source via a duct formed in the master cylinder, the non-return valve being arranged at the outlet of the duct.

SUMMARY OF THE INVENTION

According to the invention, the non-return valve is arranged at the end of a pipe, the other end of which is connected in a sealed manner to the duct formed in the master cylinder, the valve and the pipe being advantageously incorporated into the reservoir and, being able to form a monolithic assembly with the latter. The pipe then has an extension which is inserted in a sealed manner into an orifice provided for this purpose in the master cylinder and communicating with the duct.

BRIEF DESCRIPTION OF THE DRAWINGS

The invention will now be described by way of example with reference to the accompanying drawings in which:

FIG. 1 shows diagrammatically in section an assembly in accordance with a first embodiment of the invention;

FIG. 2 shows diagrammatically the assembly illustrated in FIG. 1 in partial section along the line II—II of FIG. 1, and FIG. 3 shows diagrammatically in section an assembly in accordance with a second embodiment of the invention.

DETAILED DESCRIPTION OF THE INVENTION

Referring now to the figures which have just been described in brief, the assembly consisting of a pneumatic booster 1, a master cylinder 3 and a reservoir 5 has been shown highly diagrammatically, it being understood that a person skilled in the art is perfectly familiar with these components. They will, moreover, not be described below except in their relationship with the invention.

The booster 1 has a housing, the chamber under vacuum being, in the example shown, the chamber adjacent to the illustrated front wall of the booster. A spring 7 resting on a dish itself resting on a reinforcement provided inside this chamber against the housing returns the piston (not shown) of the booster to its position of rest.

The master cylinder 3 penetrates inside the booster. It is fastened in a sealed manner to this front wall of the booster, via a flange 9 provided with an annular seal 11, by means of screws (not shown). In one embodiment, the assembly will be fastened to the vehicle bulkhead via this same flange 9.

The reservoir 5 is arranged so as to feed the chambers of the master cylinder 3 with fluid in an entirely conventional manner.

A duct 21 is formed in the master cylinder parallel, for example, to the axis of the latter. This duct 21 is in direct communication with the chamber under vacuum. An outlet orifice 23 is provided for communicating with the duct 21.

In the embodiment shown in FIGS. 1 and 2, a non-return valve 30 is directly inserted into the outlet orifice 23.

In the embodiment shown in FIG. 3, the non-return valve 30 is arranged at one end of a pipe 25, the other end of which is inserted into the orifice 23. For this purpose, the pipe 25 has an extension which can be introduced into an annular component made of elastomer and fastened to the orifice 23 in order to prevent any sealing problems.

In addition, in order to facilitate the fitting of this pipe 25 into the orifice 23 and to reduce the assembly time, the pipe 25 and the valve 30 are incorporated into the reservoir 5. Thus, on fitting the latter onto the master cylinder 3, both the pipe 25 and the two customary fluid outlets are directly connected to the master cylinder in a single operation. Preferably, the pipe 25, the valve 30 and the reservoir 5 are of monolithic design so as to constitute a single component obtained by ultrasonic sealing of two components injected after addition of the valve element and the conventional float of the detector of the fluid level in the reservoir.

A person skilled in the art will appreciate that it is possible to bring about numerous modifications to the invention without departing from the scope defined by the claims.

What we claim is:

1. An assembly composed of a vacuum pneumatic booster, a master cylinder and a reservoir of fluid under low pressure which feeds said master cylinder, said booster having at least one chamber connected to a vacuum source via a non-return valve, said chamber being connected to said source via a duct formed in said master cylinder, said non-return valve being arranged at the end of a pipe the other end of which is connected in a sealed manner to said duct, said non-return valve and said pipe being incorporated into said reservoir.

2. An assembly according to claim 1, wherein said non-return valve, said pipe and said reservoir form a monolithic assembly, said pipe having an extension which is inserted in a sealed manner into an orifice provided in the master cylinder and communicating with said duct.

* * * * *